Figure 2A:
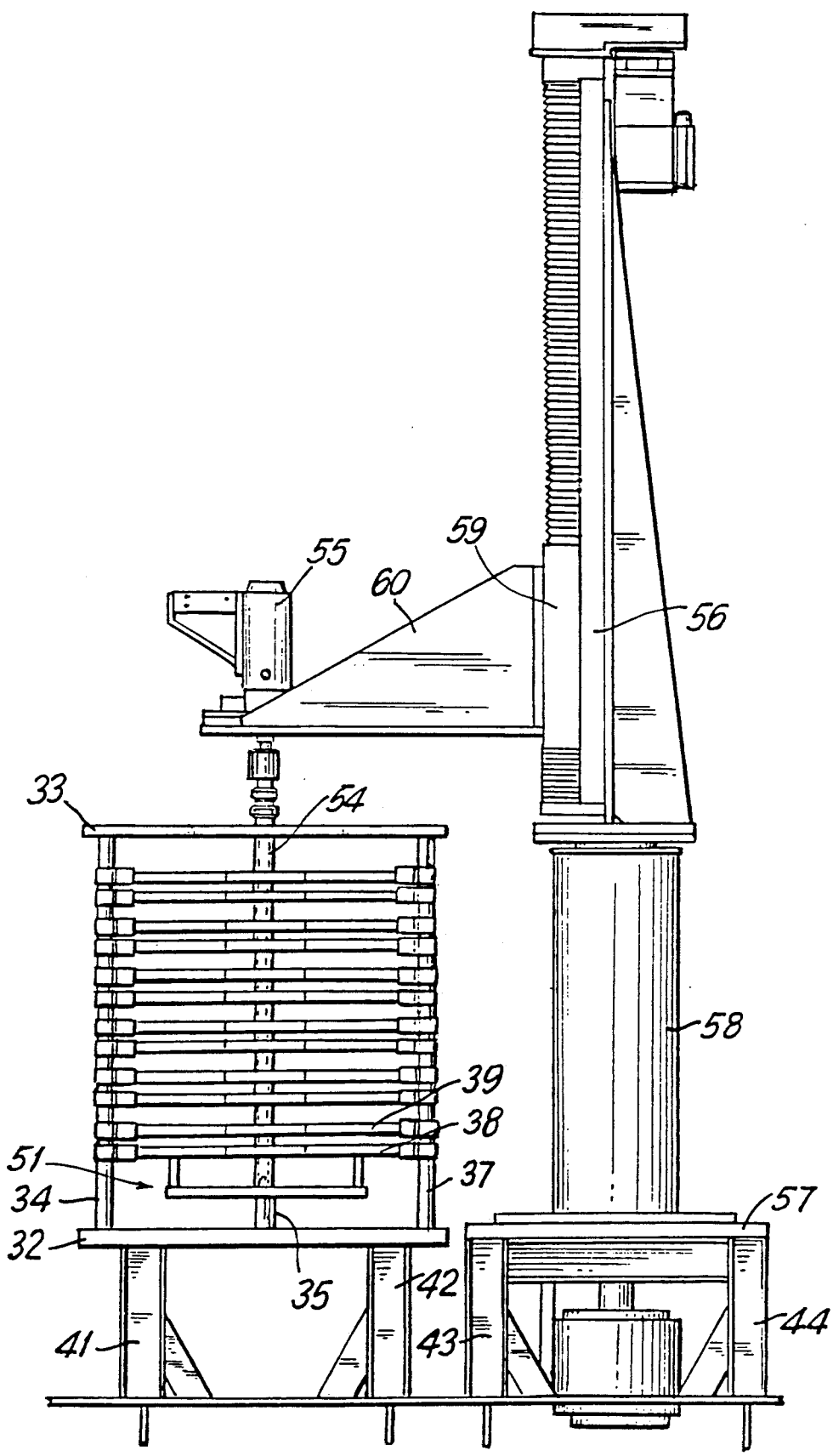

United States Patent [19]

Riemscheid et al.

[11] Patent Number: 5,054,182
[45] Date of Patent: Oct. 8, 1991

[54] ASSEMBLY DEVICE FOR ASSEMBLING CAMSHAFTS

[75] Inventors: Helmut Riemscheid, Wahlscheid; Karl Weiss, Augustin; Herbert Frielingsdorf, Lohmar; Engelbert Schwarz, Ruppichteroth; Heribert Grewe, Overath, all of Fed. Rep. of Germany

[73] Assignee: Emitec Gesellschaft fur Emissionstechnologie mbH, Lohmar, Fed. Rep. of Germany

[21] Appl. No.: 544,030

[22] Filed: Jun. 26, 1990

Related U.S. Application Data

[62] Division of Ser. No. 243,099, filed as PCT DE87/00602 on Dec. 19, 1987, published as WO88/04719 on Jun. 30, 1988, abandoned.

[30] Foreign Application Priority Data

Dec. 20, 1986 [DE] Fed. Rep. of Germany ....... 3643803

[51] Int. Cl.⁵ .............................................. B21D 39/00
[52] U.S. Cl. ...................................... 29/281.5; 29/283
[58] Field of Search ............... 29/6, 421.1, 283, 283.5, 29/281.1, 281.4, 281.5, 252; 72/60–62, 56; 269/45, 43, 71, 48.1

[56] References Cited

U.S. PATENT DOCUMENTS

| 4,597,365 | 7/1986 | Madaffer . |
| 4,660,269 | 4/1987 | Suzuki ................................. 29/421.1 |
| 4,691,905 | 9/1987 | Tamura et al. ........................ 269/45 |
| 4,750,250 | 6/1988 | Maus et al. .......................... 29/421.1 |
| 4,763,503 | 8/1988 | Hughes et al. ......................... 72/61 |

FOREIGN PATENT DOCUMENTS

| 0230731 | 8/1957 | European Pat. Off. . |
| 2922509 | 12/1980 | Fed. Rep. of Germany . |
| 3302762 | 2/1984 | Fed. Rep. of Germany . |
| 3616901 | 11/1986 | Fed. Rep. of Germany . |
| 3530600 | 3/1987 | Fed. Rep. of Germany . |
| 3812353 | 11/1988 | Fed. Rep. of Germany . |
| 2050207 | 2/1981 | United Kingdom . |

Primary Examiner—Robert C. Watson
Attorney, Agent, or Firm—Toren, McGeady & Associates

[57] ABSTRACT

The invention relates to an assembly device for assembling camshafts, comprising a holding device for axially fixing individual elements such as cam discs, bearing seats or gears, including a pressure agent probe for hydraulically expanding a hollow shaft in sections, with the elements and the shaft being connected to each other in a force-locking way.

The holding device has been provided with individual fixing discs each having a central aperture for receiving one of the elements such as cam discs, bearing seats or gears as well as an outer bearing seat for being received in a bearing region of the holding device. These fixing discs permit angularly accurate fixing of the individual elements prior to assembly, with the hollow shaft being able to carry out radial movements relative to these.

26 Claims, 4 Drawing Sheets

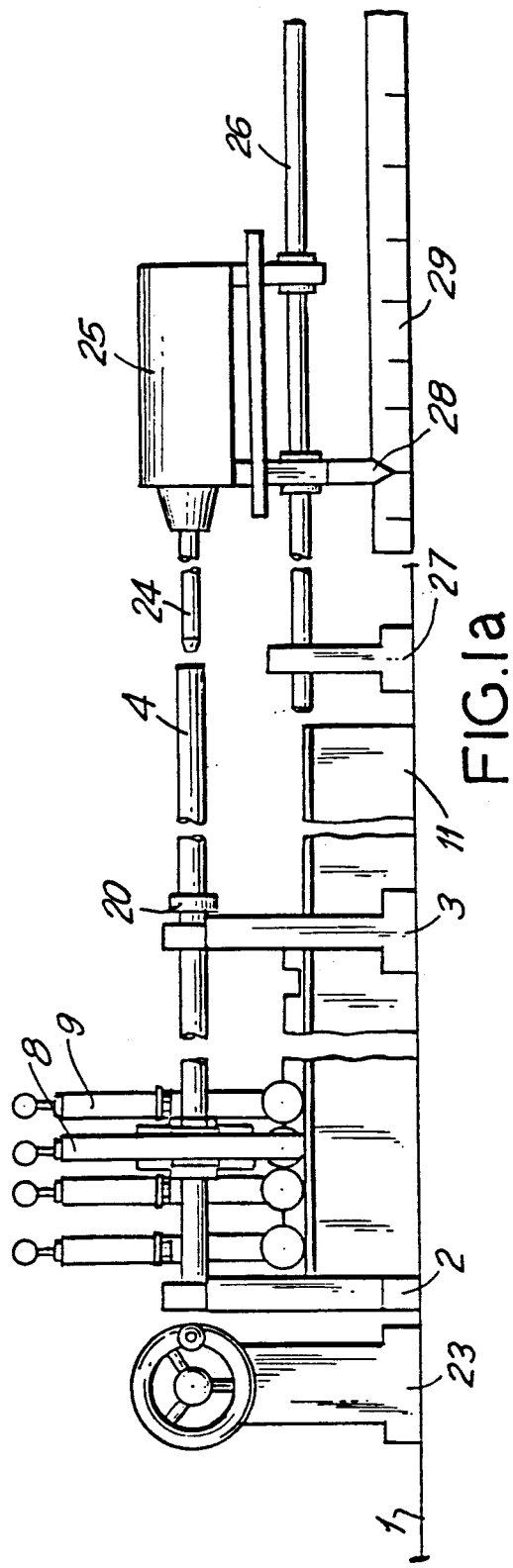
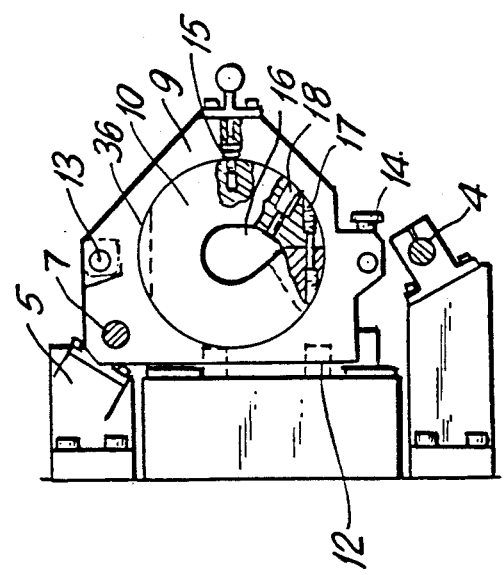
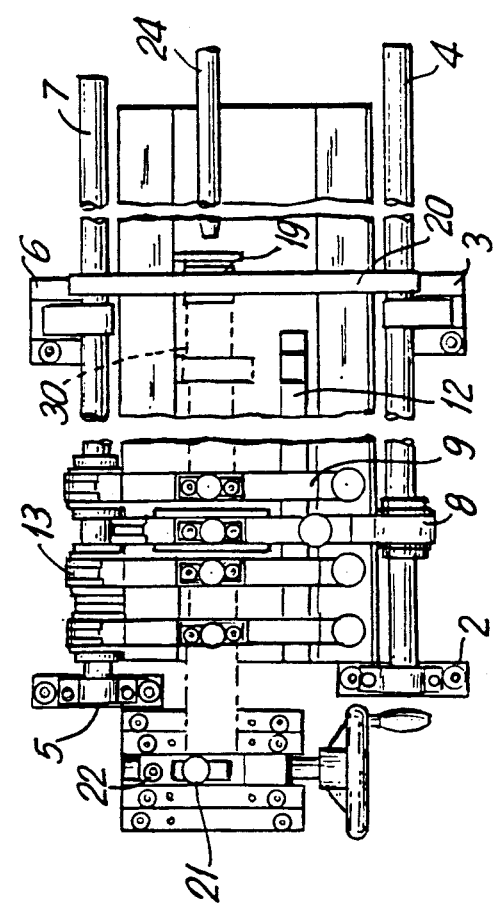
FIG.1a
FIG.1b
FIG.1c

ASSEMBLY DEVICE FOR ASSEMBLING CAMSHAFTS

This is a division of application Ser. No. 07/243,099, filed as PCT DE87/00602 on Dec. 19, 1987, published as WO88/04719 on Jun. 30, 1988, abandoned.

DESCRIPTION

The invention relates to an assembly device for assembling camshafts, comprising a holding device for axially fixing individual elements such as cam discs, bearing rings, gear wheels or bevel gears, including a pressure agent probe for hydraulically expanding a hollow shaft in sections, with the elements and the hollow shaft being connected to each other in a force-locking way. Furthermore, the invention relates to a process, especially suitable for being carried out with such a device, for assembling camshafts.

A device of the above type is described in DE 35 30 600.9 in the case of which the individual elements are held in a device so as to be angularly accurate and axially fixed and where a probe with a corresponding number of associated expanding portions is inserted into the hollow shaft. Details of the design of the device are not given in the application, and in any case, probes with several expanding regions cannot be produced without any problems.

It is the object of the present invention to provide a device of the above-mentioned type which is suitable for volume production of camshafts. Preferably, it should be possible to adapt such a device quite easily to different camshaft types without causing a great deal of expenditure. In particular, the object is to make it possible to handle modified cam or gear shapes, modified angular positions of the cams and modified distances between cams, regardless of whether pressure agent probes with only one expanding portion or several expanding portions are used.

The objective is achieved in that the holding device has been provided with individual fixing discs each comprising a central aperture for receiving a respective element and an outer bearing seat for being received in a bearing region of the holding device. Such an assembly device makes it possible to introduce the individual elements together with the fixing discs receiving them quickly and into a predetermined position into the holding device and to remove the latter automatically together with the fixing discs after completion of the camshaft.

Loading the fixing discs with the individual elements and removing the finished shaft from the fixing discs is advantageously achieved using two sets of fixing discs in a second device, with the process of connecting the elements with the shaft in the assembly device taking place simultaneously with the process of loading and unloading the second device in order to save time.

Apart from exceptional cases such as camshafts for single cylinder machines where axial removal of the camshaft from the fixing discs seems possible, it is normally particularly advantageous for the fixing discs to be divided in the centre to permit and facilitate loading and unloading of the second device not illustrated in detail. In a further advantageous embodiment, the fixing discs are actually closed, but they comprise a tensioning device divided in the centre, with the loading of the assembly device taking place with the fixing discs being in a pulled-out position.

Furthermore, it is advantageous for the fixing discs to comprise on their outside an annular or partially annular bearing seat for being rotatably received in a bearing region to be able to change the angular position of the elements in a simple way without greatly having to modify the holding device. It is particularly advantageous if the outside of the fixing discs is provided with one radial or several bores through which a fixing pin can engage the respective bearing region in order to determine the angular position. However, it is also possible to provide several circumferentially distributed clamping elements for permanently determining the angular position of the elements.

It can be seen that by exchanging the fixing discs while otherwise leaving the overall device unchanged it is easy to adapt the device to modified cam shapes, with the safe support of the fixing discs in the holding device remaining unchanged. Due to the external round bearing seat it is possible to set the angular position without any problems by turning the fixing disc, for example in order to change in a problem-free way the control times of the camshaft with the camshaft in principle remaining unchanged. Accurate positioning of the elements in the fixing discs is essential in order to achieve the required angular position.

A higher degree of adaptability is achieved by providing fixing discs with a divisible tensioning device whose mutually movable tensioning jaws fixable in their end positions comprise receiving prisms and/or receiving cups. Such tensioning jaws are capable of receiving cams of different sizes; only with extreme differences in size is it necessary to exchange or modify the tensioning jaws. The centric position of the cam bore is set by adjusting the pneumatically operated tensioning jaws and the angular position of the cams is effected by turning the fixing discs, as described above.

In a particularly advantageous embodiment of the invention, the bearing regions are held in individual, especially longitudinally movable bearing housings, which means that it is also possible to adapt the device to the production of camshafts with completely different distances between cams and different numbers of cams. This means that one and the same device can be used for successive production series of camshafts for completely different engine types, different for example in the number of cylinders or the number of valves per cylinder.

In an equivalent embodiment of the invention, the bearing regions are provided in one single bearing housing which is divisible especially in the way a die is divisible. This will be the preferred type of device for producing large series of camshafts. This type of device has the advantage of being less likely to cause any errors because the risk of a radial offset of the individual bearing regions is eliminated in the course of application.

An advantageous embodiment for centrally divided fixing discs provides for the bearing housing(s) to be divisible especially horizontally so that the fixing discs and the hollow shaft can easily be replaced. A preferred embodiment for undivided fixing discs with a centrally divided tensioning device consists in arranging the bearing housings on guiding means in such a way that they can be pulled out individually, i.e. in the way of chest drawers which can automatically be refilled individually.

The longitudinal guiding means for the axially movable individual housing preferably consist of parallel bars passing through the essentially disc-shaped bearing housing.

The distances between the longitudinally movable individual housing may be determined with standard measuring devices and special tensioning means. However, in a particularly advantageous embodiment the device, for each camshaft type, has been provided with a replaceable ledge which, in the form of a gauge, ensures the required distance between the housings and in consequence, between the elements to be fixed on the shaft. This ledge is to be arranged in the longitudinal direction of the hollow shaft and fixed in such a way that it can be replaced.

For receiving the hollow shaft, an advantageous embodiment of the device contains one or two end receiving bearings which are preferably arranged on the same longitudinal guiding means like the bearing housings in such a way as to be longitudinally movable and whose receiving apertures provided with longitudinal stops are arranged exactly coaxially relative to the bearing regions.

To permit the device to function as required, the pressure agent probe is provided with a longitudinally movable probe holding device which permits the pressure agent probe to be moved in and out of the clamped-in hollow shaft. To the extent that the probe comprises several expanding portions permitting the completion of the camshaft in one single operation, the probe has to be designed in such a way that it can be replaced in its entirety, with one probe being suitable for different camshafts of the same basic engine type. In the case of a probe comprising only one single expanding portion and permitting the camshaft to be completed in several operations, the probe holding device contains a replaceable scale whose distances between markings correspond to the set distances between the bearing regions.

Pressure agent probes of the type described here are known as probes for fixing heat exchanger tubes in tube plates. The probe holding device of such probes essentially consists of a handle by means of which the pressure agent probe is introduced "freehand" into the tube. Such a method may lead to angular errors adversely affecting sealing in the course of the expanding process and possibly leading to the expanded portions not being centred accurately. In this context it should be taken into account that the hollow shaft may be subject to inaccuracies of its internal diameter which may lead to different sealing gaps across its circumference. A further object of the invention therefore consists in providing a method improving the centring of the probe inside the internal tube diameter. The objective is achieved by providing a method according to which, in the course of expansion, the probe on the one hand and the hollow shaft and/or the elements on the other hand are held so as to be radially movable relative to each other and parallel. This arrangement achieve self-centring of the probe in the tube so that radial stresses and distortions of the hollow shaft as a result of the expansion processes are reduced to a minimum. The method in accordance with the invention may be put into effect by means of a radial play of the fixing discs in the bearing regions or by means of flexible holding means for the elements between the bearing regions.

The method may also be carried out by using flexible bearing elements for the probe holding means on the associated longitudinal guiding means or end bearings for the hollow shaft with a radial play.

Figure 2B:
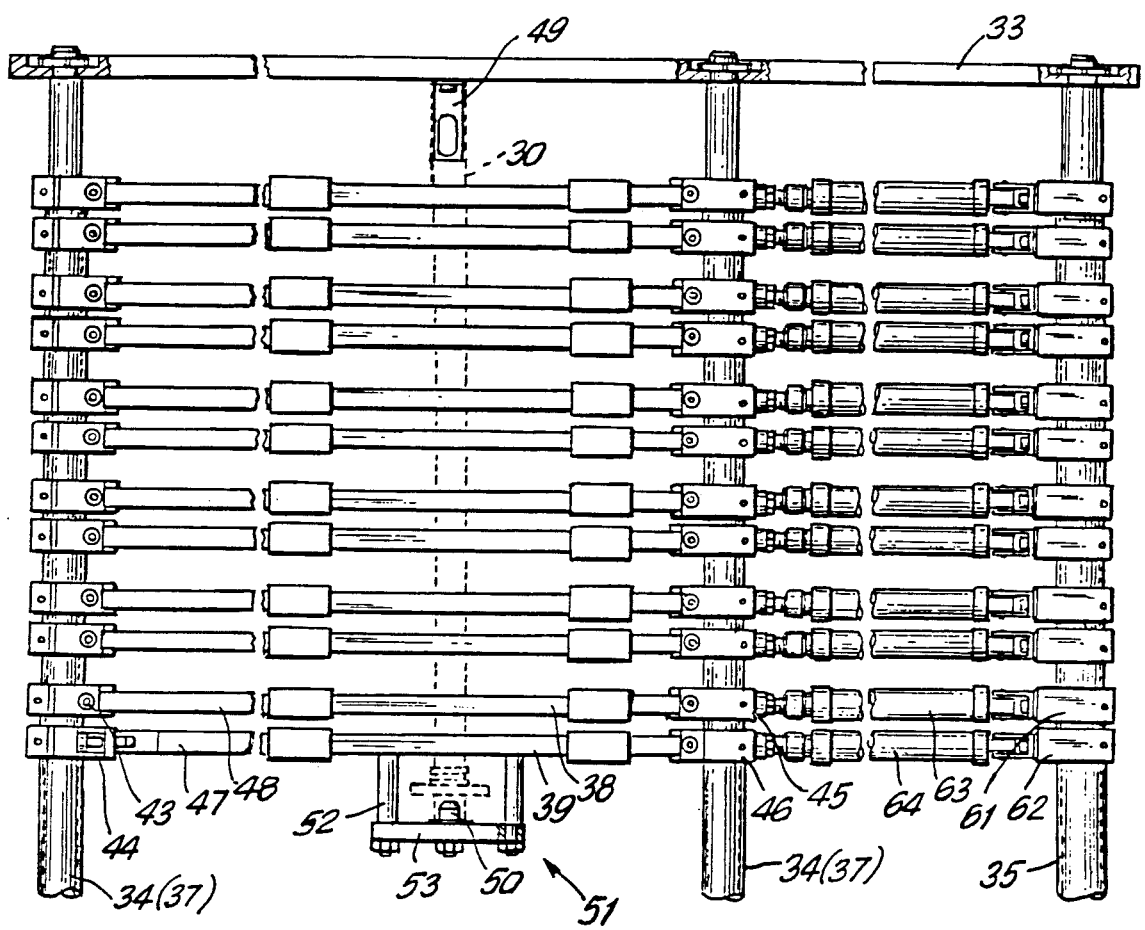

Two embodiments of the device in accordance with the invention are given in the enclosed drawings wherein FIG. 1a shows a complete lateral view of a first embodiment of the invention FIG. 1b shows a partial plan view of a device according to FIG. 1a FIG. 1c shows an axial view of a device according to FIGS. 1a and 1b with a fixing disc, partially in section FIG. 2a shows a complete lateral view of a second embodiment of the device according to the invention FIG. 2b shows a partial view of a device to FIG. 2a turned by 90°

Figure 2C:
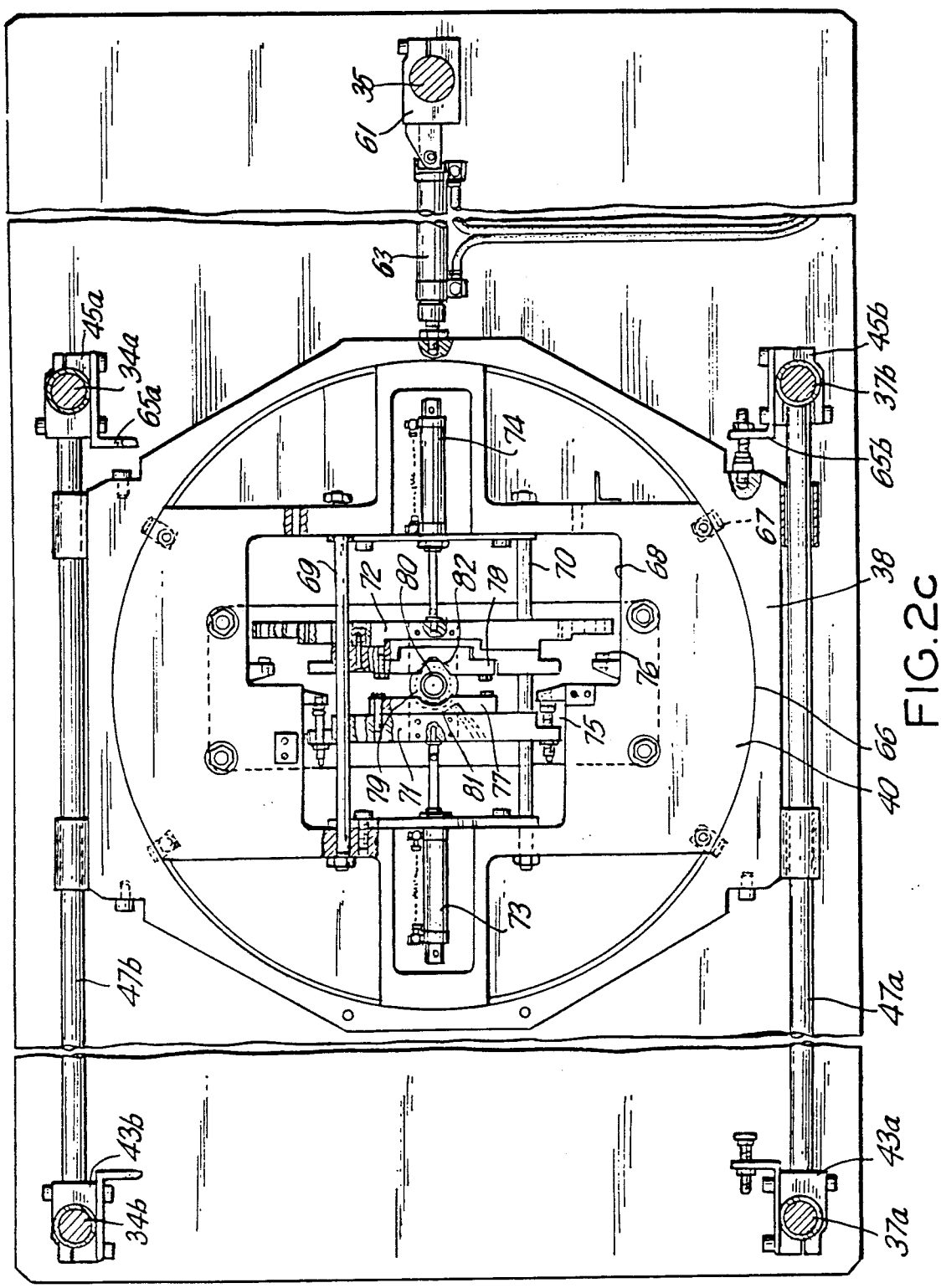

FIG. 2c shows a cross-sectional view of a device to FIGS. 2a and 2b, with the fixing disc being shown in an an axial view.

FIGS. 1a and 1b show a machine base 1 comprising two first bearing blocks 2, 3 for receiving a first guiding bar 4 and two second bearing blocks 5, 6 for receiving a second guiding bar 7. The first guiding bar 4 swivably supports a divisible housing 8 for receiving a first element such as a bearing seat; the second guiding bar 7 swivably supports several divisible housings 9 for receiving a fixing disc 10 each by which elements of a second type may be accommodated. Otherwise, the housings swivable around their respective guiding bars are supported on longitudinal guiding means 11. The distance between them is determined by a scale-like guiding ledge 12. The housings 9 axially fixed by the ledge 12 are divided horizontally and supported so as to be openable around an axis 13, with a bolt 14 permitting tensioning of the housing halves. For receiving the hollow shaft, provision has been made for a first end receiving bearing 19 which is held in a cheek guided on both guiding bars 4, 7, and for a second end receiving bearing 21 which is held in a guiding carriage 22 adjustable in at least one direction, but preferably adjustable in two directions perpendicular to each other, with the guiding carriage 22 being adjustable in a separate spindle head 23.

A pressure agent probe 24 is coaxially arranged relative to the hollow shaft 30 shown in dashed lines and held in a probe holding device 25 which is axially movable on longitudinal guiding means 26 held in at least one bearing block 27. The probe holding device comprises an indicator 28 which, together with a scale 29 connected to the machine base, indicates the axial position of the pressure agent probe. The probe holding device is swivable at least around the guiding bar 26, but preferably it is arranged so as to be movable in parallel in all directions. A shown in FIG. 1c, the housing 9 contains a radilly removable fixing pin 15 determining the angular position of the fixing disc 10 which is rotatably held in the annular bearing region 36. The fixing disc 10, in turn, in divided in the direction of the longer axis of the central cam aperture 16 and fixed by tensioning screw 17. Adjusting screw 18 inside the fixing disc serve to adjust and fix the cams to be introduced.

FIG. 2a shows an assembly device in the case of which a joint machine base 31 comprises a first unit for receiving several housings 38, 39 and a second unit for receiving a probe holding device 55. Standards 41, 42 provided on the machine base 31 carry a horizontal base plate 32 holding parallel guiding bars 34, 37 connected to each other via a further plate 33. As will be described in more detail below, the guiding bars 34, 37 serve to hold the individual housings 38, 39 arranged on these arranged at the distance of the cam elements to be fixed, in pairs for the individual cyclinder units. A further guiding bar 35 with a different task is seen to be partially covered. Below the lower housing there is attached an end receiving bearing 51 for the end of the hollow shaft 30 indicated by dashed lines. Two further standards 43, 44 carry a base plate 57 and a column 58 on which there is positioned longitudinal guiding means 56 on which a carrier 59 with an extension arm is guided electrically so as to be longitudinally adjustable, with the probe holding device 55 being inserted into the carrier 59. The displacement region of the carrier 59 is such that the probe 54 can be moved completely out of the housings 38, 39 and the upper base plate 33.

FIG. 2b shows the guiding bars 34, 37 for the housings 38, 39 as well as the further guiding bar 35 on which hydraulic cylinders 43, 44 are arranged in pairs so as to be associated with the housings. The guiding bars 34, 35, 37 rest on the base plate 32 (not illustrated) and are connected to each other at their ends via the joint cover plate 33. At the lower housing 39 provision has been made for an end receiving bearing 51 comprising two bolts 52, a base plate 53 and a centring pin 50. On the cover plate 33 provision has been made for a guiding piece 49 for the probe. The hollow shaft 30 is indicated by dashed lines. The housings 38, 39 are not directly held on the guiding bars 34, 37, but indirectly via clamping pieces 43, 44, 45, 46 connected to each other via guiding bars 47, 48. From these guiding bars, which are shortened in the illustration, the housings 38, 39 are axially movable towards the left from the position indicated, at least by half the housing length, but preferably by the entire housing length, with such movement being effected by pneumatic cylinders 43, 44 (shortened in the illustration) whose height is adjustable via clamping pieces 61, 62.

FIG. 2c shows an individual housing 38 movable on horizontal guiding bars 47, with these guiding bars 47 being held in clamping pieces 43, 45 which, in turn, are adjustable on the guiding bars 34, 37. The movement of the housing 38 on the guiding bars 47 is effected by the pneumatic cylinder 63 which is shortened in the illustration and articulatingly acts on a clamping piece 61 whose height is adjustable on guiding bar 35. The clamping pieces 45 are provided with adjustable stops 65 for adjusting the housing 38. The housing interior contains an annular bearing region 66 into which the fixing disc 10 is rotatably inserted, with clamping elements 67 being capable of fixing its position. The fixing disc 40 comprises four individual guiding portions as it is not designed as a complete disc. In an inner recess 68 there are arranged parallel guiding bars 69, 70 on which tensioning jaws 71, 72 are arranged opposite each other so as to be movable by pneumatic cylinders 73, 74. The end positions are determined by adjustable stop devices 75, 76. The tensioning jaws comprise replaceable formations 77, 78 which, in the embodiment illustrated, form a receiving cup 81 and a receiving prism 82. Holding collars 79 which are bolted underneath the tensioning jaws and whose through-bore is larger than the cam bore form a support for the cam 80 to be inserted. The formations 77, 78 are transversely adjustable relative to the tensioning jaws 71, 72, whereas their adjustment in their end position is effected in the direction of feed by the stop devices 75, 76. This permits accurate centring of the cam bore, whereas the angular position is achieved by turning and adjusting the relatively large fixing disc 40 in the housing 38, with accurate adjustment being possible to parts of angular degrees. The pneumatic cylinders 73, 74 illustrated are double acting cylinders. To remove the complete camshaft, the tensioning jaws 71, 72 are completely moved back to be able axially to remove the cams 80 of different angular positions together with the hollow shaft 30 without obstructions, while the cams can be inserted with the tensioning jaws 71, 72 being in a compressed but pressure-relieved position.

List of reference numbers
1: machine base
2, 3: bearing block
4: guiding bar
5, 6: bearing block
7: guiding bar
8, 9: housing
10: fixing disc
11: longitudinal guiding means
12: guiding ledge
13: axis (of housing 9)
14: bolt
15: fixing pin
16: cam aperture
17: tensioning screw
18: adjusting screw
19: end receiving bearing
20: cheek
21: end receiving bearing
22: guiding carrier
23: spindle head
24: pressure agent probe
25: probe holding device
26: longitudinal guiding means (probe)
27: bearing block
28: indicator
29: scale
30: hollow shaft
31: machine base
32, 33: base plate
34: guiding bar
35: guiding bar
36: bearing region
37: guiding bar
38, 39: housing
40: fixing disc
41, 42: standard
43, 44: clamping piece
45, 46: clamping piece
47, 48: guiding bar
49: guiding piece
50: centring pin
51: end receiving bearing
52: bolt
53: base plate
54: pressure agent probe
55: probe holding device
56: probe guiding means
57: base plate
58: standard
59: carrier
60: extension arm
61, 62: clamping piece
63, 64: pneumatic cylinder
65: stops
66: bearing ring
67: clamping element
68: recess
69, 70: guiding bar
71, 72: tensioning jaw 73, 74: pneumatic cylinder
75, 76: stop device
77, 78: formations
79: holding collar
80: cams
81: receiving cup
82: receiving prism

We claim:

1. An assembly device for assembling camshafts, comprising a holding device for axially fixing individual elements such as cam discs, bearing rings, gear wheels or bevel gears, including a pressure agent probe for hydraulically expanding a hollow shaft in sections, with the elements and the hollow shaft being connected to each other in a force-locking way, wherein the improvement comprises that the holding device is provided with individual fixing discs (10, 40) each having an axis and comprising a central aperture (16, 68) for receiving a respective element and an outer bearing ring for being received in a bearing seat (36, 66) of the holding device.

2. A device according to claim 1, wherein the fixing discs (10) each comprise two parts, and wherein a dividing plane extrudes between said parts and intersects the axes of the discs.

3. A device according to claim 1, wherein the fixing discs (40) each comprise a clamping device (69–78), each clamping device comprising two clamping parts, a dividing plane between said parts and intersects the axes of the discs.

4. A device according to claims 2 or 3, wherein the fixing discs (10,40) comprise an annular outer bearing ring for being rotatably received in bearing seat (36).

5. A device according to claims 2 or 3, wherein the fixing discs (10, 40) comprise a partially annular outer bearing ring with at least 3 guiding regions for being rotatably received in the bearing seat (66).

6. A device according to claims 2 or 3, wherein the fixing discs (10, 40) are each provided with at least one bore in the outer bearing ring for fixing the angular position in the bearing seat (66) by means of a fixing pin (15).

7. A device according to claims 2 or 3, wherein the fixing discs (10,40) are provided with circumferentially distributed fixing devices (67) at the outer bearing ring for fixing the angular position in the bearing seat (66).

8. A device according to claim 3, wherein the clamping device (69–78) within the fixing discs is provided with mutually repositionable and adjustable clamping jaws (71, 72) with at least one of receiving prisms (80) and receiving cups (79).

9. A device according to claim 8, wherein the fixing disc (40) are arranged horizontally, and wherein the at least one of the receiving prisms (82) and the receiving cups (81) comprise support collars (79) for the individual cams.

10. A device according to claim 8, wherein the clamping jaws (71, 72) are pneumatically displaceably slidable on parallel guides (69, 79) against adjusting stops (75, 76).

11. A device according to claims 2 or 3, comprising a joint bearing housing which receives all the bearing seats.

12. A device according to claims 2 or 3, comprising individual bearing housings (8, 9; 38, 39) each comprising one bearing seat (36; 66).

13. A device according to claim 12, wherein the individual bearing housings (8, 9; 38, 39) are arranged in the holding device so as to be longitudinally slidable.

14. A device according to claim 12, wherein the bearing housings (8, 9) comprise two halves each, a dividing plane extending between said halves intersecting an axis of each housing, and wherein the housing halves are connected to each other so as to be clampable and openable.

15. A device according to claim 12, wherein the bearing housings (38, 39), in a plane, perpendicularly to the axis of the hollow shaft (30), are arranged so as to be pulled out individually from their entirety.

16. A device according to claim 15, wherein the bearing housings (38, 39) are arranged so as to be suitable for being pulled out on parallel guiding means consisting of two bars (47, 48).

17. A device according to claim 16, wherein the individual bearing housings (8, 9; 38, 39) and the parallel guiding means for pulling out purposes are arranged axially displaceably on parallel guiding means consisting especially of two to four bars (4, 7; 34, 37).

18. A device according to claim 12, wherein at least one replaceable ledge (12) is arranged parallel to to the direction of displacement of the bearing housings (8, 9) and having transverse grooves as positioning means for axially fixing the individual bearing housings (8, 9).

19. A device according to claim 1, wherein one or two end receiving sleeves (19, 21; 51) with at least one longitudinal stop for centering and receiving the hollow shaft (30) are provided and arranged coaxially relative to the bearing seats (36, 66).

20. A device according to claim 1, wherein one or two end receiving sleeves (19, 21; 51) with at least one longitudinal stop are provided for radially displaceably receiving the hollow shaft (30), while being arranged approximately coaxially relative to the bearing seats (36, 66).

21. A device according to claim 1, comprising a pressure agent probe holding device (25; 55) movable in the direction of the end receiving sleeves (19, 21; 51) and the bearing seats (36; 66) for moving a pressure agent probe (24; 54) in and out of the hollow shaft (30).

22. A device according to claim 21, wherein the pressure agent probe holding device (25) is guided in parallel guiding means consisting especially of two rods (26).

23. A device according to claim 22, wherein the probe holding device (25, 55) is arranged so as to be radially displaceable relative to the holding device for the elements and the holding device for the hollow shaft (30).

24. A device according to claim 14, wherein the two halves of the bearing housings extend horizontally.

25. A device according to claim 14, wherein the housing halves are pivotably openable.

26. A device according to claim 23, wherein the probe holding device is radially displaceable by means of flexible guiding means in the probe holding device.

* * * * *